(12) United States Patent
Shah et al.

(10) Patent No.: US 7,532,232 B2
(45) Date of Patent: May 12, 2009

(54) SYSTEM AND METHOD FOR SINGLE ACTION INITIATION OF A VIDEO CONFERENCE

(75) Inventors: Krutarth Shah, Fremont, CA (US); Randy K. Harrell, Los Gatos, CA (US); Kenneth W. Erion, Sheridan, OR (US); Rajneesh Kumar, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 292 days.

(21) Appl. No.: 11/456,735

(22) Filed: Jul. 11, 2006

(65) Prior Publication Data

US 2007/0263078 A1 Nov. 15, 2007

Related U.S. Application Data

(60) Provisional application No. 60/794,016, filed on Apr. 20, 2006.

(51) Int. Cl.
*H04N 7/14* (2006.01)
*H04L 12/28* (2006.01)
(52) U.S. Cl. ............... 348/14.09; 348/14.08; 348/14.12
(58) Field of Classification Search ... 348/14.01–14.16; 370/260–261; 709/204; 379/202.01, 203.01
See application file for complete search history.

(56) References Cited

U.S. PATENT DOCUMENTS

| 5,541,639 | A |  | 7/1996 | Takatsuki et al. | .......... 348/14.1 |
| 5,903,637 | A | * | 5/1999 | Hogan et al. | ........... 379/203.01 |
| 6,774,927 | B1 |  | 8/2004 | Cohen et al. | ............... 348/14.1 |
| 6,795,108 | B2 |  | 9/2004 | Jarboe et al. | ............. 348/14.09 |
| 6,989,856 | B2 |  | 1/2006 | Firestone et al. | ......... 348/14.09 |
| 7,043,528 | B2 |  | 5/2006 | Schmitt et al. | .............. 709/204 |
| 2002/0103864 | A1 | * | 8/2002 | Rodman et al. | ............. 709/204 |
| 2004/0010464 | A1 |  | 1/2004 | Boaz | ........................... 705/40 |
| 2005/0260976 | A1 | * | 11/2005 | Khartabil et al. | ........... 455/416 |
| 2007/0070940 | A1 | * | 3/2007 | Vander Veen et al. | ....... 370/328 |

OTHER PUBLICATIONS

PCT Notification of Transmittal of the International Search Report and the Written Opinion of the International Searching Authority, or the Declaration with attached International Search Report and the Written Opinion, in International Application No. PCT/US07/09514, dated Oct. 1, 2008, 11 pages.

* cited by examiner

*Primary Examiner*—Melur Ramakrishnaiah
(74) *Attorney, Agent, or Firm*—Baker Botts L.L.P.

(57) ABSTRACT

A method is provided for configuring a video conference endpoint. The method comprises receiving session data that comprises endpoint connection data for remote endpoints associated with scheduled conferences, and receiving a signal from a user interface indicating a user has activated a control associated with a selected conference, identifying the endpoint connection data for the remote endpoint associated with the selected conference, and establishing a media session with the associated remote endpoint. A video conference endpoint system also is provided. The system comprises a controller coupled to a memory, and a user interface coupled to the controller. The user interface includes a command button associated with a conference. The controller periodically receives session data associated with the scheduled conferences, stores the session data in the memory, and establishes the selected conference in response to a user activating the command button.

4 Claims, 3 Drawing Sheets

SYSTEM AND METHOD FOR SINGLE ACTION INITIATION OF A VIDEO CONFERENCE

RELATED APPLICATIONS

This application claims priority to U.S. Patent Application Ser. No. 60/794,016, entitled "VIDEOCONFERENCING SYSTEM," which was filed on Apr. 20, 2006.

TECHNICAL FIELD

This invention relates in general to communication systems, and more particularly to a system and method for initiating a video conference with a single action.

BACKGROUND

Video conferencing, also known as video teleconferencing, is a form of visual collaboration that has existed in some form or another since the introduction of the television. Primitive forms of video conferencing were demonstrated with closed circuit television systems using cable. NASA also implemented a primitive form of video conferencing during the first manned space flights, using multiple radio links.

Such techniques, however, proved to be too expensive and otherwise impractical for more mundane applications, such as business meetings. Video conferencing did not become a viable communication option for these applications until improvements in bandwidth and compression techniques in the 1980s and 1990s enabled practical transmission over digital networks. Finally, IP-based communication systems emerged as a common conferencing medium in the late 1990s.

Today, video conferencing applications are spreading throughout the business and healthcare industries, as well as the general public. The underlying technology continues to evolve, however, and new processes and systems need to be developed to improve the quality, reliability, and simplicity of this cutting edge communications medium.

SUMMARY

In accordance with the present invention, the disadvantages and problems associated with the complexity of video conferencing operations have been substantially reduced or eliminated. In particular, particular embodiments facilitate the commercial operation of video conferences while reducing potential interference from technical operations.

In accordance with one embodiment, a method is provided for configuring a video conference endpoint. The method comprises receiving session data that comprises endpoint connection data for remote endpoints associated with scheduled conferences, and receiving a signal from a user interface indicating a user has activated a control associated with a selected conference, identifying the endpoint connection data for the remote endpoint associated with the selected conference, and establishing a media session with the associated remote endpoint.

In accordance with another embodiment, a video conference endpoint system is provided. Such an embodiment comprises a controller coupled to a memory, and a user interface coupled to the controller. The user interface includes a command button associated with a conference selected from a group of scheduled conferences. The controller is operable to periodically receive session data associated with the scheduled conferences, to store the session data in the memory, and to establish the selected conference in response to a user activating the command button.

An advantage of certain embodiments is a greatly simplified interface for conference participants. Moreover, this interface facilitates a more traditional telephone call paradigm in which a caller initiates communication with a remote party, rather than being a passive participant subject to rigid automation processes. These techniques may be used to ensure that endpoints of a scheduled call, such as complex video-conferencing systems, successfully establish a conference. These techniques may further be used to enable individual participants in a scheduled conference to more easily connect to the conference.

Other technical advantages may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

The principles of the present invention may be implemented in a variety of hardware and software configurations. As is commonly understood in the art, the structure for implementing the functions described below may comprise any appropriately configured data processing hardware, software, process, algorithm, or combination thereof.

Additionally, certain embodiments are described below with reference to an exemplary network of functional elements. Each such functional element may represent a hardware device, software, process, or any combination thereof. A "network" comprises any number of these functional elements coupled to and in communication with each other through a communications medium. A "communications medium" includes without limitation any conductive, optical, electromagnetic, or other medium through which a functional element can transmit data. Unless otherwise indicated in context below, all network nodes may use publicly available protocols or messaging services to exchange signals, messages, and other forms of electronic communication with each other through a network.

Software and data structures associated with certain aspects typically are stored in a memory, which may be coupled to a functional element directly or remotely through a network. The term "memory," as used herein, includes without limitation any volatile or persistent medium, such as an electrical circuit, magnetic disk, or optical disk, in which a data or software may be stored for any duration. A single memory may encompass and be distributed across a plurality of media.

One objective of certain embodiments is to provide video conference participants a simple-to-use interface that conceals the complexity of the system infrastructure. Accordingly, the system and method described below illustrate features and operations of certain embodiments that enable a conference participant to initiate a video conferencing session with a single action.

The present invention contemplates operation in an environment of a conventional audio and video conferencing system. Certain embodiments, though, are intended to operate in conjunction with conferencing elements designed to provide an experience that simulates a face-to-face conference. For instance, such elements may comprise one or more high-definition screens of sufficient dimensions to display life-size images of conference participants, while audio components provide high-definition surround sound. Such an experience is referred to herein as a "telepresence" conference to convey the concept of a conferencing system that surpasses the quality and experience of conventional video conferencing experiences.

Figure 1:
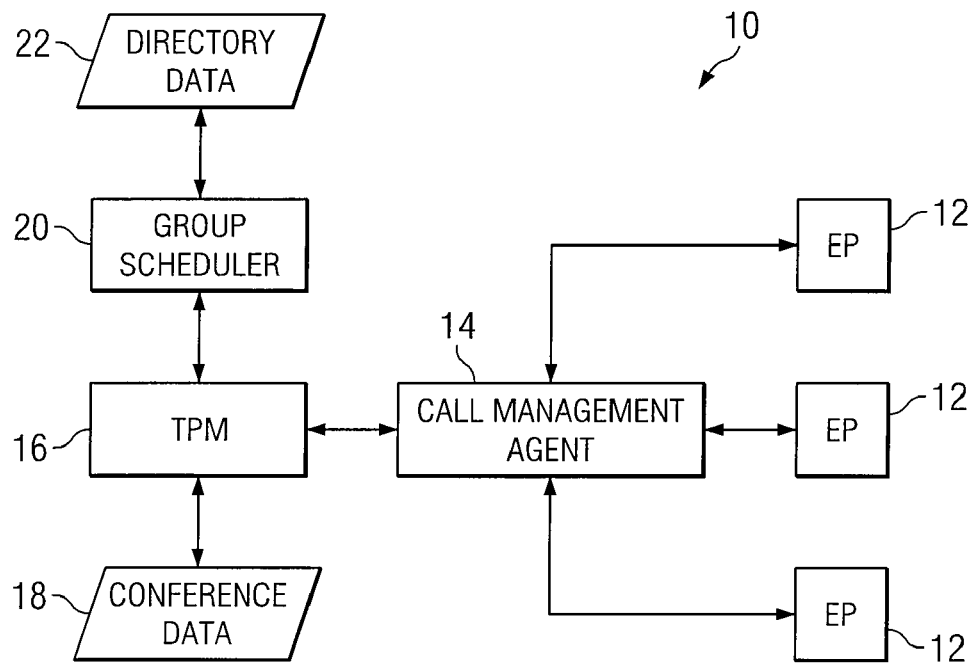
FIG. 1 is a simplified block diagram of an example network 10 for exchanging data in accordance with certain teachings of the present invention.

FIG. 1 is a simplified block diagram of an example network 10 for exchanging conference data. Network 10 comprises endpoints 12 managed by a call management agent 14. A telepresence manager (TPM) 16 also is coupled to call management agent 14. Conference data 18 is stored in a memory coupled to TPM 16. Group scheduler 20 and associated directory data 22 are coupled to TPM 16 through network 10.

Call management agent 14 represents any communication platform that may implement various IP signaling protocols and functions. In general, a call management agent is an intermediary element that establishes sessions and facilitates dialogs between endpoints. A call management agent also may receive requests from endpoints and determine how the requests should be answered. Thus, a call management agent also may serve as an endpoint in a communication system or network. A call management agent generally maintains dialog state and participates in all requests sent in dialogs that it has established, allowing it to provide some advanced calling features to endpoints. In a particular embodiment, call management agent 14 is a call management agent that is manufactured and marketed as "Cisco Call Manager" by Cisco Systems, Inc. of San Jose, Calif.

TPM 16 represents any communication platform that may implement functions for tracking conference schedules and interfacing with a call management agent to manage endpoint resource needed to support the conference schedules. In a particular embodiment, TPM 16 is a communication platform manufactured and marketed as "Cisco Telepresence Manager" by Cisco Systems, Inc. Conference data 18 represents the data associated with the conference schedules and, particularly, the data associated with endpoints 12 needed to support the conference schedules. Conference data 16 may include endpoint identifiers ("IDs"), endpoint connection data, conference time, conference organizer, conference subject, and other attributes. Endpoint connection data comprises any data necessary to establish a session with a given endpoint, such as an extension, directory number, IP address, or fully qualified number (FQN). Endpoint connection data may further include additional data, such as conference identifiers, authentication and authorization data (e.g., passcodes, administrator codes), extra digits to dial, pre-recorded participant identifiers, or other appropriate data for establishing a connection and initiating or joining a conference.

In one embodiment, TPM 16 does not directly track conference schedules. Rather, TPM 16 subscribes to group scheduler 20, which tracks conference schedules and notifies TPM 16 of new, modified, or deleted conferences. Group scheduler 20 represents any functional element that facilitates group collaboration, scheduling, and organizational communications. Examples of contemporary group schedulers include, without limitation, MICROSOFT OUTLOOK and EXCHANGE, LOTUS NOTES, ORACLE, YAHOO! Calendar, GOOGLE Calendar, and NETSCAPE COMMUNICATOR. Directory data 22 represents data associated with the group collaboration, scheduling, and organizational communications. In general, directory data 22 and conference data 18 are not coextensive. Rather, directory data 22 is broader in scope and conference data 22 is extracted from directory data 22 as needed to support the operations of TPM 16. For instance, directory data 22 may include extensive contact information associated with conference participants (and other individuals), which is not associated with any endpoint needed to support the conference schedules.

Endpoints 12 represent functional elements that originate or terminate media, such as voice and video. An endpoint can call other endpoints, and may be called by other endpoints. An endpoint may implement one or more signaling and session protocols to implement these functions. Accordingly, an endpoint may be viewed as an H.323 terminal, H.323 gateway, SIP user agent (UA), or other appropriate system element depending on the perspective of a given protocol or system architecture. From the perspective of call management agent 14, TPM 16 also may be viewed as an endpoint to the extent that it leverages signaling and session protocols to implement its functions.

According to particular embodiments, these concepts may be applied to reduce the interaction required for individual participants in a scheduled conference. In these embodiments, TPM 16 may push conference information to a single endpoint associated with a user scheduled to participate in a conference. For example, TPM 16 may push conference information, including endpoint connection data, to a desktop or other device associated with a particular user scheduled to participate in a conference.

Figure 2:
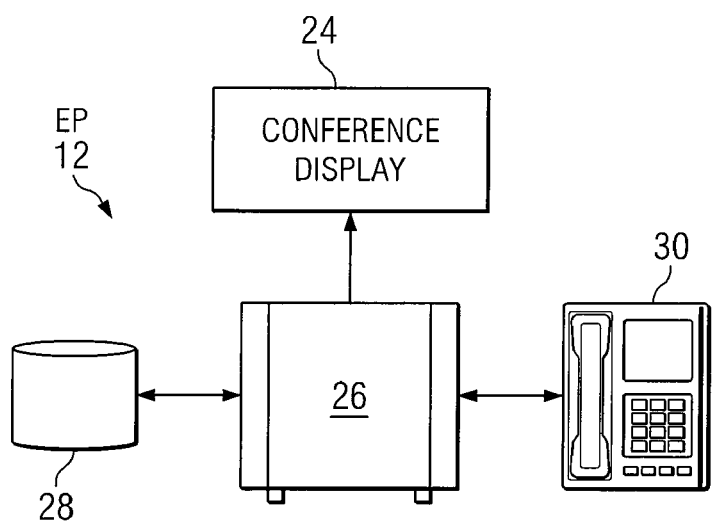
FIG. 2 is a simplified diagram of an example embodiment of an endpoint.

FIG. 2 is a simplified diagram of an example embodiment of an endpoint. The functional elements of an endpoint as illustrated include, without limitation, conference display 24, controller 26, session data 28, and user interface 30. Typically, an endpoint further includes an element for video input (e.g., a camera), audio input (e.g., a microphone), and audio output (e.g., speakers). Conference display 24 represents any video output element operable to display images of conference participants, while user interface 30 represents any functional element operable to interact with an end-user (particularly a conference participant).

As depicted in FIG. 2, one embodiment of user interface 30 may be a telephone device, particularly a telephone device that supports IP-based signaling and session protocols. User interface 30 also may include a display of scheduled conferences and associated attributes stored in session data 28. Generally, session data 28 and conference data 18 are not coextensive, and session data 28 typically represents only a sub-set of conference data 18. In general, session data 28 comprises only conference data associated with a configurable time period, and may further be limited to only attributes needed for establishing media sessions (e.g., endpoint connection data) and displaying a limited schedule to system users.

Controller 26 represents any functional element operable to communicate with other elements of network 10 to perform tasks such as retrieving session data 28 from TPM 16, storing session data 28 in a memory, and establishing media sessions using call management agent 14. In certain embodiments, controller 26 also controls the behavior of user interface 30 and receives user input from user interface 30. Controller 26 may further comprise a codec, which is any functional element operable to compress/decompress media streams associated with a conference.

Figure 3:
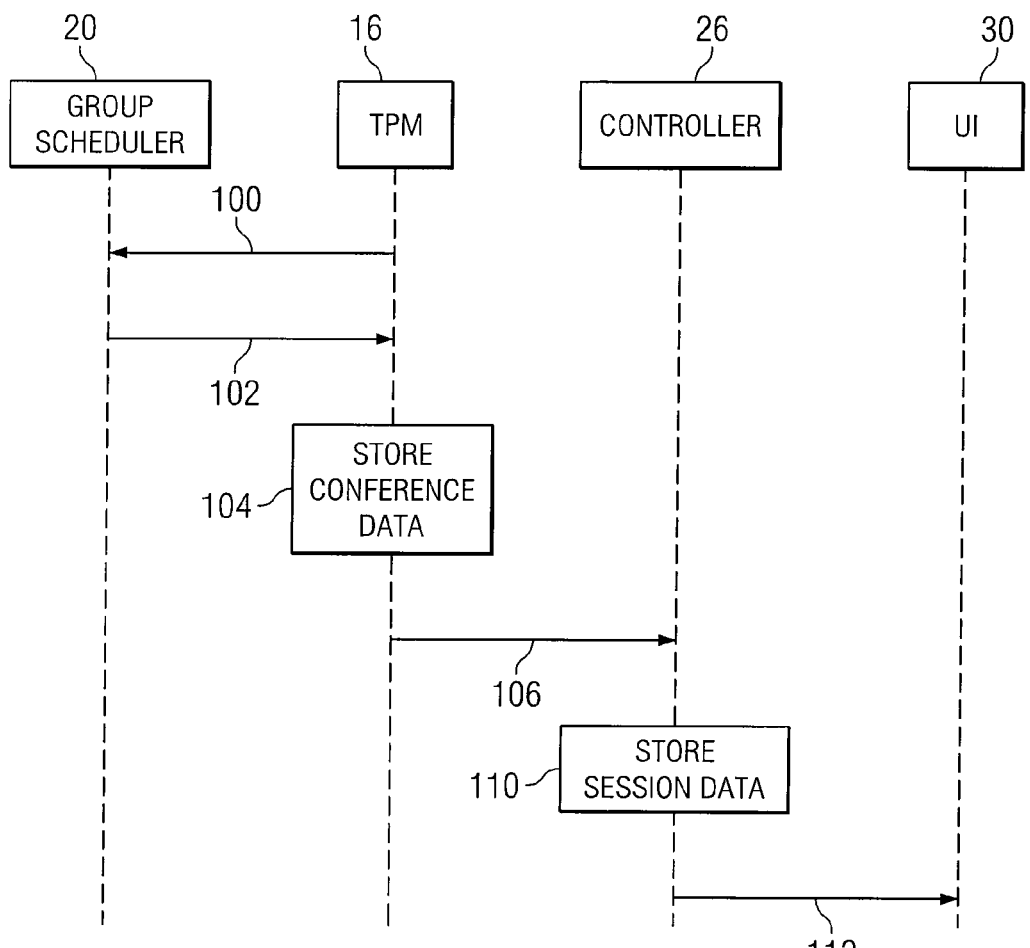
FIG. 3 is a sequence diagram that illustrates an example operation of elements in the network of FIG. 1.

FIG. 3 is a sequence diagram that illustrates an example operation of elements in network 10. This operation presumes that an administrator has configured endpoints 12, call management agent 14, and group scheduler 20, so that endpoints 12 each have an associated endpoint ID known to call management agent 14 and group scheduler 20. Moreover, this example further presumes that at least one conference participant has used group scheduler 20 to schedule a conference requiring an endpoint 12, so that directory data 22 includes the relevant endpoint ID, conference time, contact data, and other relevant attributes. Finally, this operation presumes that TPM 16 is aware of endpoints 12 and their respective endpoint IDS.

In step 100, TPM 16 subscribes to group scheduler 20 and requests directory data associated with the endpoint IDs. If group scheduler recognizes the endpoint IDs, group scheduler returns the associated directory data to TPM 16 in step 102. TPM 16 then extracts conference data 18 from the associated directory data and stores conference data 18 (step 104). Group scheduler 20 subsequently notifies TPM 16 of any new, modified, or deleted conferences, and TPM 16, in turn, updates conference data 18 as needed. In steps 106, TPM 16 extracts session data 28 from conference data 18 and pushes session data 28 to controller 26 associated with endpoint 12. Controller 26 then stores session data 28 in a memory (step 110). Finally, in step 112, controller 26 extracts and pushes display data to user interface 30. Display data generally comprises session data associated with a limited time period, including conference objects. Conference objects comprise descriptive attributes associated with a given conference, such as a subject, the organizer (or other contact information), and relevant scheduling data.

Figure 4:
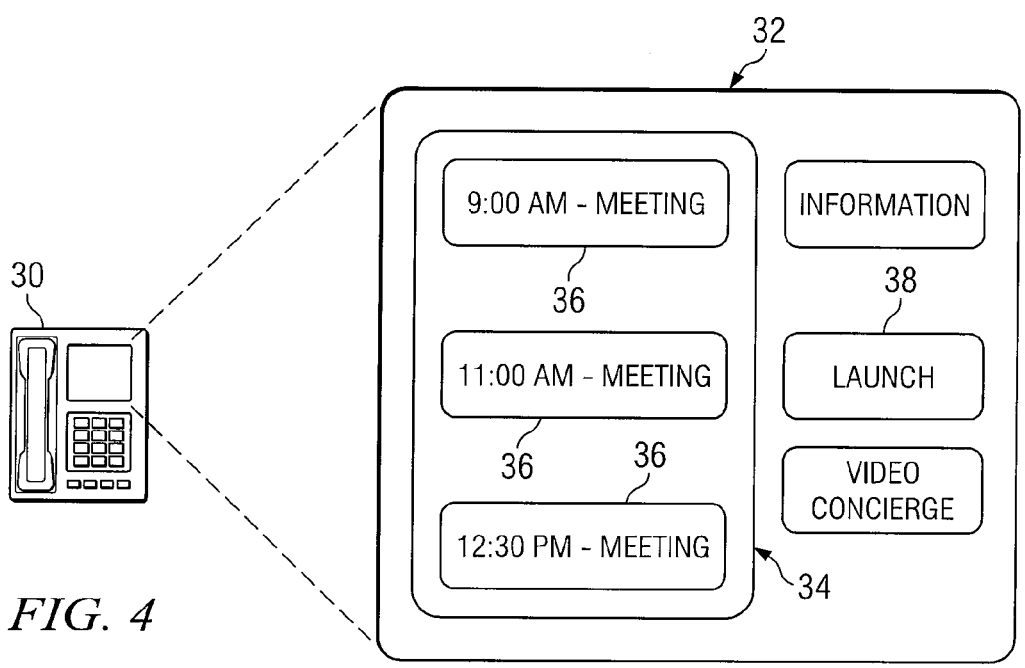
FIG. 4 is a simplified diagram of an example display associated with one embodiment of a user interface.

FIG. 4 is a simplified diagram of an example display associated with one embodiment of a user interface 30. Display 32 is representative of a display as it would appear after the example operation of FIG. 3, in which controller 26 has pushed display data to user interface 30. Display 32 comprises a limited conference schedule 34. Conference schedule 34 comprises user-selectable conference elements 36 that display descriptive attributes of a given conference object. Display 32 further comprises one or more controls that activate associated processes. In display 32, such a control is represented as a command button 38 and labeled "LAUNCH." The label "LAUNCH" is used merely to identify the button, and any term or image that signifies such activity, including but not limited to international symbols and forms of the word meaning to launch or place a call could be substituted for the term "LAUNCH". Command button 38 may be, for example, a "soft key" associated with a portion of display 32 in which selected conference information is displayed. In one embodiment, this control is associated with a process that establishes a video conference session with a remote endpoint as described below with reference to FIG. 5.

In operation, user interface 30 receives conference information for at least one upcoming conference and may present selected portions of this information using display 32, for example, at some predetermined time prior to the scheduled conference. Based on user preferences or other suitable data, user interface 30 may display varying portions of conference information. For example, if a user marks a conference as private or secure, user interface 30 may display a limited set of information as compared with typical conferences.

If a scheduled conference is not initiated within some pre-set period of time, if network 10 detects that an associated user has joined the scheduled conference from some other location, or for other suitable reasons, user interface 30 may remove conference information from display 32. For example, at a predetermined period of time after the scheduled beginning or ending of a scheduled conference, user interface 30 may remove conference information from display 32.

According to particular embodiments, endpoint 12 may employ security protocols to prevent unauthorized access and use of system to join a scheduled conference. Such security protocols may include any suitable measures, such as personal identification codes associated with the scheduled user, proximity detection of scheduled participants using radio frequency identification, or any other suitable techniques for authorizing access to the launch of the scheduled conference.

Figure 5:
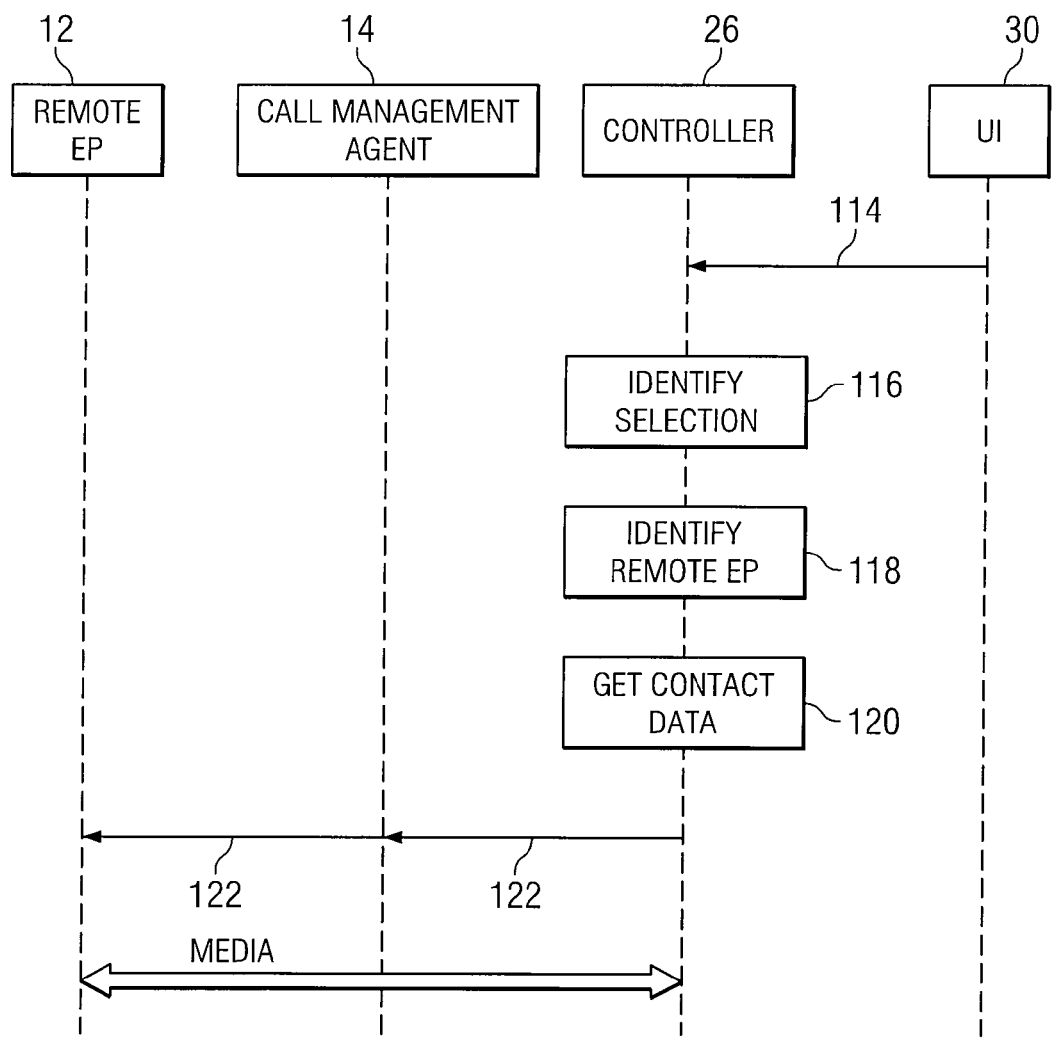
FIG. 5 is a sequence diagram that illustrates an example operation of elements in the network of FIG. 1.

FIG. 5 is a sequence diagram that illustrates an example operation of elements in network 10 to launch a scheduled conference. In certain embodiments, this operation is activated in response to a signal or message from user interface 30 indicating that a user has activated an associated command button (step 114). The signal also indicates that a user has selected a particular conference element before activating the associated command button. Upon receiving the signal from user interface 30, controller 26 identifies the conference object associated with the selected conference element (step 116) and the remote endpoint 12 associated with the conference object (step 118). Controller 26 then extracts the contact data associated with the remote endpoint 12 (step 120), and establishes a media session with remote endpoint 12 (step 122) using call management agent 14. In appropriate circumstances, controller 26 may use administrative data to establish or join a conference. Administrative data generally includes supplemental information necessary for a session that is not generally available to conference participants. For example, controller 26 may send extra digits, passcodes, administrator codes, pre-recorded messages, or other appropriate information to facilitate a conference.

Although the present invention has been described with at least one specific embodiment, a myriad of changes, variations, alterations, transformations, and modifications may be suggested to one skilled in the art, and it is intended that the present invention encompass such changes, variations, alterations, transformations, and modifications as fall within the scope of the appended claims.

For instance, other embodiments are contemplated in which the user interface described above may be integrated with a radio frequency or electronic identification system such that a video conference may be activated upon detection and verification of a particular conference participant, without direct action by the participant. Moreover, security mechanisms and other policies may be integrated with the embodiments described above to prevent fraudulent or unauthorized use of such a embodiments.

In yet another embodiment, multiple video conferencing endpoints may be configured. For example, data may be received for a common connection destination, such as a video switch, and a signal from each user interface associated with each video conferencing endpoint may be received indicating that a user at each location has activated a control associated with a selected conference. The connection date may be identified for the common connection destination and a media session established with that associated common connection device.

What is claimed is:

1. A telepresence system comprising:
   a telepresence manager coupled to a first memory and a group scheduler; and
   a controller coupled to the telepresence manager and a second memory; and
   a user interface coupled to the controller, the user interface having a command button associated with a telepresence conference selected from a group of scheduled telepresence conferences;
   wherein the telepresence manager is operable to retrieve directory data associated with the scheduled telepresence conferences from the group scheduler, to extract conference data from the directory data, to store the conference data in the first memory, to extract session data from the conference data, and to exchange the session data with the controller; and
   wherein the controller is operable to receive the session data from the telepresence manager periodically, to store the received session data in the second memory, and to access the received session data to establish the selected telepresence conference in response to a user activating the command button.

2. The telepresence system of claim 1, wherein the user interface is operable to receive display data from the controller and to display a list of the scheduled telepresence conferences associated with the display data, wherein the display data is limited to session data associated with a configurable time period, and wherein the selected telepresence conference is selected from the list by the user.

3. The telepresence system of claim 1, wherein the session data comprises a remote endpoint identifier associated with each of the scheduled telepresence conferences, and connection data associated with each remote endpoint identifier; and wherein the controller uses the connection data to establish the selected telepresence conference with a remote endpoint associated with the remote endpoint identifier.

4. The telepresence system of claim 1, wherein the user interface is operable to receive display data from the controller and to display a list of the scheduled telepresence conferences associated with the display data, wherein the display data is limited to session data associated with a configurable time period, and wherein the selected telepresence conference is selected from the list by the user; and wherein the session data comprises a remote endpoint identifier associated with each of the scheduled telepresence conferences, and connection data associated with each remote endpoint identifier; and wherein the controller uses the connection data to establish the selected telepresence conference with a remote endpoint associated with the remote endpoint identifier.

* * * * *